United States Patent [19]
Nakamura

[11] Patent Number: 5,280,354
[45] Date of Patent: Jan. 18, 1994

[54] VIDEO CAMERA WITH FLARE CORRECTING CIRCUIT

[75] Inventor: Koichi Nakamura, Kanagawa, Japan

[73] Assignee: Sony Corporation, Tokyo, Japan

[21] Appl. No.: 859,810

[22] Filed: Mar. 30, 1992

[30] Foreign Application Priority Data

Apr. 4, 1991 [JP] Japan ............................. 3-099418
Apr. 11, 1991 [JP] Japan ............................. 3-106714

[51] Int. Cl.⁵ ..................... H04N 5/235; H04N 5/57; H04N 5/14
[52] U.S. Cl. .................................. 358/168; 358/169; 358/166; 358/163; 358/160
[58] Field of Search .................. 358/160, 163, 213.19, 358/228, 168, 169, 174

[56] References Cited

U.S. PATENT DOCUMENTS

| | | | |
|---|---|---|---|
| 3,621,132 | 11/1971 | Page | 358/160 |
| 4,302,777 | 11/1981 | Kemner et al. | 358/160 |
| 4,575,758 | 3/1986 | Egeröd | 358/166 |
| 4,589,019 | 5/1986 | Dischert et al. | 358/160 |
| 4,799,106 | 1/1989 | Moore et al. | 358/168 |
| 4,974,810 | 12/1990 | Fiske | 250/216 |
| 5,155,586 | 10/1992 | Levy et al. | 358/54 |

FOREIGN PATENT DOCUMENTS 59-127480 7/1984 Japan ............................. 358/170

Primary Examiner—Michael T. Razavi
Assistant Examiner—Joseph Colaianni
Attorney, Agent, or Firm—William S. Frommer; Alvin Sinderbrand

[57] ABSTRACT

A video camera equipped with an image sensor for producing an analog video signal, an A-D converter for converting the analog video signal to a digital video signal in a manner that any component thereof above a predetermined luminance level is clipped, and a flare correcting circuit for removing any flare component superposed on the digital video signal. The flare correcting circuit comprises an average luminance level detector for detecting the average luminance level during a time period of several fields of the digital video signal; a clip period detector for detecting the time period, during which the analog signal is clipped, when the analog video signal is converted to the digital video signal by the A-D converter; a flare correction signal generator for producing a flare correction signal in accordance with the output signal of the average luminance level detector and the output signal of the clip period detector; and a subtracter for subtracting the flare correction signal from the digital video signal.

5 Claims, 8 Drawing Sheets

FIG. 11

| b9 | b8 | b7 | b6 | b5 | b4 | b3 | b2 | b1 | b0 | ~S5

| b8 | b7 | b6 | b5 | b4 | b3 | b2 | b1 | b0 | ~S72

−)

| b9 | b8 | b7 | b6 | b5 | b4 | b3 | b2 | b1 | b0 | ~S6

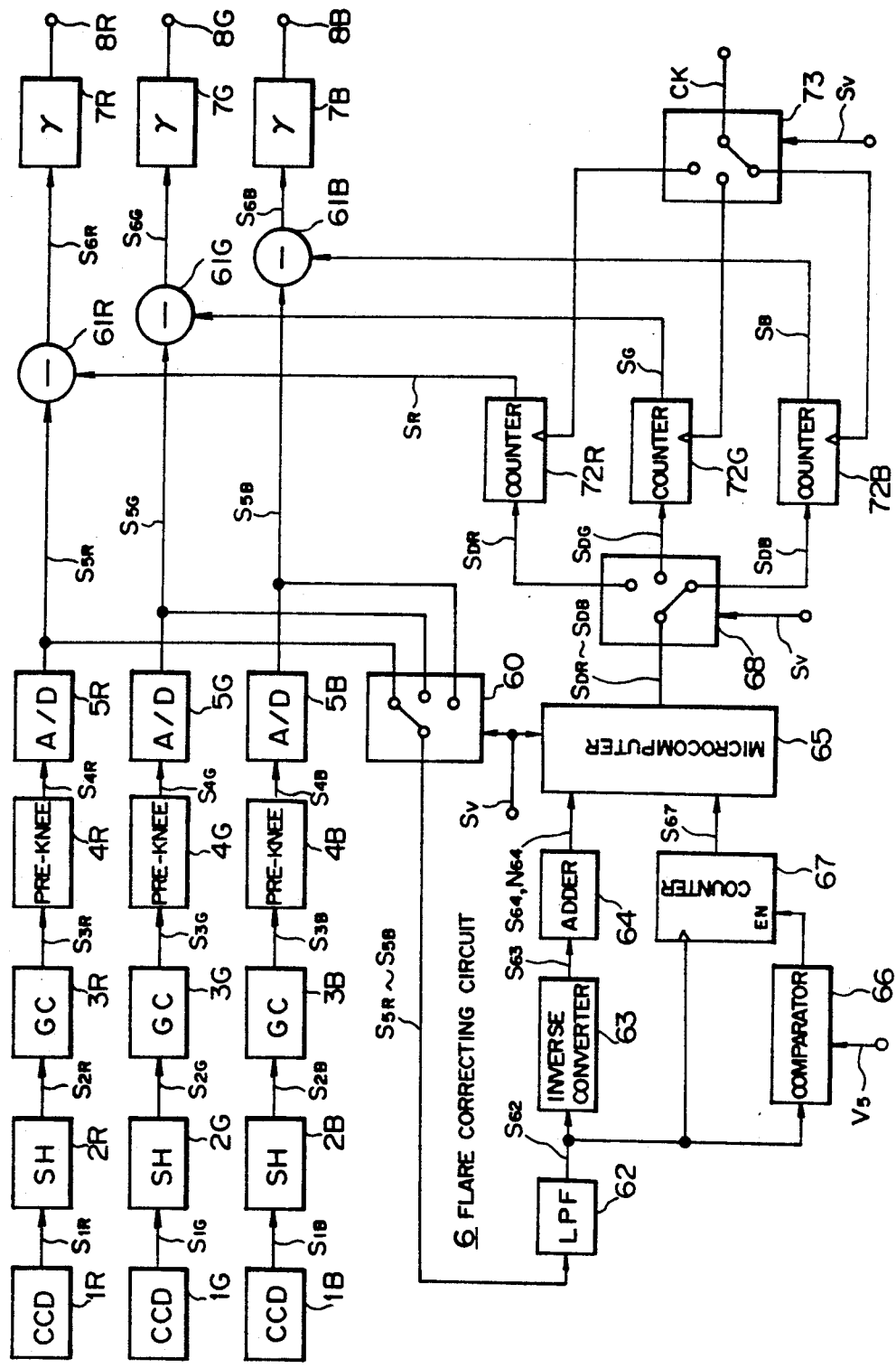

VIDEO CAMERA WITH FLARE CORRECTING CIRCUIT

BACKGROUND OF THE INVENTION

1. Field of the Invention

The present invention relates to a video camera with a circuit for correcting flare of a video signal.

2. Description of the Prior Art

In photographing with a video camera, there may occasionally occur a phenomenon termed flare where incident light from a subject being photographed is partially reflected with diffusion inside the camera and so forth to consequently cause whitish fog of the subject image. Such flare is rendered more conspicuous in accordance with increase of high luminance portions in the subject and deteriorates the quality of the reproduced image.

For the purpose of preventing such undesired phenomenon, a video camera is generally equipped with a flare correcting circuit so as to correct any flare of the video signal.

FIG. 1 shows an exemplary constitution of a video camera including from an image sensor to a flare correcting circuit. In this diagram, an output signal S1 of a CCD image sensor 1 is supplied to a sampling-holding circuit 2, from which an effective video signal S2 is delivered to a pre-knee circuit 4 via a gain control circuit 3.

The pre-knee circuit 4 has such input-output characteristic as shown in FIG. 2 so that, when the level of the input video signal S2 has exceeded the pre-knee point, the gain relative to the output video signal S4 is reduced. Therefore in the video signal S4, the level of its high luminance component is compressed more than that of the video signal S2.

The video signal S4 is supplied to an analog-to-digital (A-D) converter 5, where the signal S4 is converted to a digital video signal S5 of which one sample is composed of parallel 10 bits for example, and then the video signal S5 is supplied to a flare correcting circuit 6.

This flare correcting circuit 6 consists of a subtracter 61 and an integrator 69 with a time constant ranging from a period of several fields to one second or so, wherein the video signal S5 from the converter 5 is supplied as a main signal to the subtracter 61 while being supplied also to the integrator 69, from which a DC component S69 (digital signal corresponding to the DC component of the signal S4) is outputted and then is supplied to the subtracter 61.

In this case, the DC component S69 is proportional to the whitish fog of the subject image derived from the flare. And in the subtracter 61, the DC component S69 is subtracted from the video signal S5, so that the resultant signal S6 is the one obtained by removing from the original video signal S5 the whitish fog caused by the flare. Namely, the signal S6 is a flare-corrected video signal.

The video signal S6 thus obtained is supplied to a gamma correcting circuit 7 for correction with respect to the gamma, and the corrected signal is outputted from a terminal 8.

However, in the flare correcting circuit 6 mentioned above, there may occur insufficiency in the amount of flare correction if any high luminance portion is existent in the subject being photographed.

When the subject is a high-luminance, white disk on a black ground illustrated as "a" in FIG. 3 for example, a video signal S4 representing the subject has a waveform as shown at "b" in FIG. 3 with changes of its level. And if the allowable input level (dynamic range) of the A-D converter 5 is V5 in comparison with such video signal S4, it follows that the signal S4 is clipped at the level V5 and merely the shaded portion in FIG. 3 is converted into a digital video signal S5.

Therefore, when a flare correction signal S69 is formed from such video signal S5, the non-shaded portion above the level V5 of the signal S4 is not used for forming the flare correction signal S69, whereby insufficient correction is induced due to employment of such flare correction signal S69.

In this case, although a pre-knee circuit 4 is provided in the preceding stage of the A-D converter 5, the level of some high luminance component of the video signal S4 may exceed the allowable input level V5 of the converter 5 since the pre-knee characteristic is not rendered flat in the high luminance component.

The above problem is eliminable if the peak value of the signal S4 supplied to the A-D converter 5 is reduced to be lower than the allowable input level V5 by adjusting the gain of the gain control circuit 3.

However, the resolution at the conversion performed by the A-D converter 5, i.e. the range of the analog level per bit, is widened to consequently cause an increase in the quantization error. Namely, due to the high luminance component of the video signal, the quantization at the visually conspicuous gray level is rendered rough.

OBJECT AND SUMMARY OF THE INVENTION

It is therefore an object of the present invention to provide a video camera equipped with an improved flare correcting circuit which is capable of solving the problems mentioned.

According to one aspect of the present invention, there is provided a video camera including an image sensor for outputting an analog video signal, an A-D converter for converting the analog video signal to a digital video signal in a manner that any component thereof above a predetermined luminance level is clipped, and a flare correcting circuit for removing any flare component superposed on the digital video signal. The flare correcting circuit comprises an average luminance level detector for detecting the average luminance level during a time period of several fields of the digital video signal; a clip period detector for detecting the time period, during which the analog video signal is clipped, when the analog video signal is converted to the digital video signal by the A-D converter; a flare correction signal generator for producing a flare correction signal in accordance with the output signal of the average luminance level detector and the output signal of the clip period detector; and a subtracter for subtracting the flare correction signal from the digital video signal.

Flare correction for the video signal is executed by the signal representing the average luminance level and also by the measured value obtained during the clip period, so that proper flare correction can be achieved despite the existance of any high luminance portion in the subject.

The above and other features and advantages of the present invention will become apparent from the following description which will be given with reference to the illustrative accompanying drawings.

BRIEF DESCRIPTION OF THE DRAWINGS

FIG. 11 schematically illustrates the operation of the third embodiment; and

FIG. 12 is a block diagram of a fourth embodiment of the present invention.

DESCRIPTION OF THE PREFERRED EMBODIMENTS

Hereinafter the present invention will be described in detail with reference to a first embodiment thereof shown in FIG. 4. In this diagram, a digital video signal S5 from an A-D converter 5 is supplied as a main signal to a subtracter 61 while being supplied also to a low-pass filter 62, so that there is obtained a digital video signal S62 from which a signal component corresponding to the high-frequency component of an original analog video signal S4 has been removed. Such removal of the high-frequency component is performed for reducing the number of bits in the result of a signal addition which will be described later. In the above high-frequency component removal, the subject being photographed is partially neglected, but harmful influence therefrom is slight and practically causes no problem since the neglected portion is merely a little.

Figure 5:
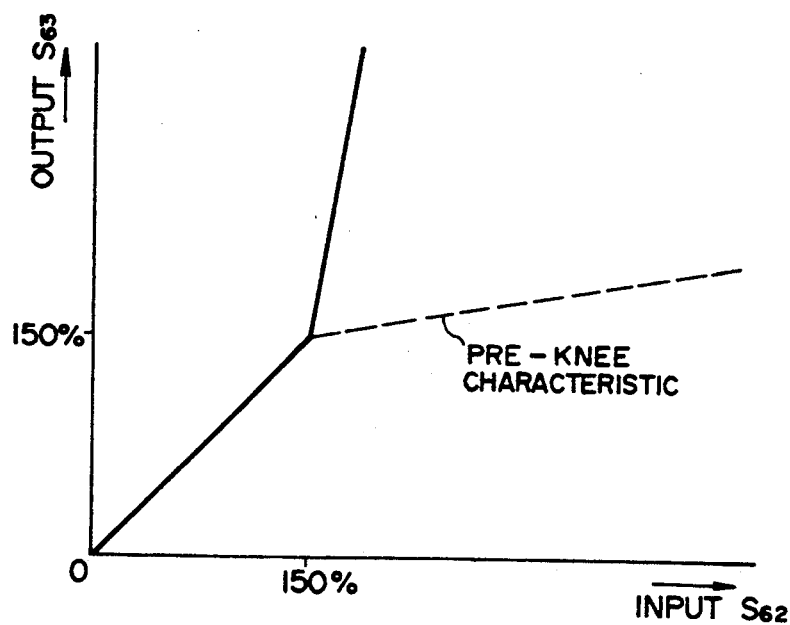
FIG. 5 graphically shows the characteristics of the present invention.

The signal S62 from the filter 62 is supplied to an inverse converter 63. This converter has an input-output characteristic represented by a solid line in FIG. 5 and complementary to the pre-knee characteristic (represented by a broken line) of a pre-knee circuit 4. Therefore a video signal S63 outputted from the inverse converter 63 has the same linearity as that of the video signal S2.

Figure 3:
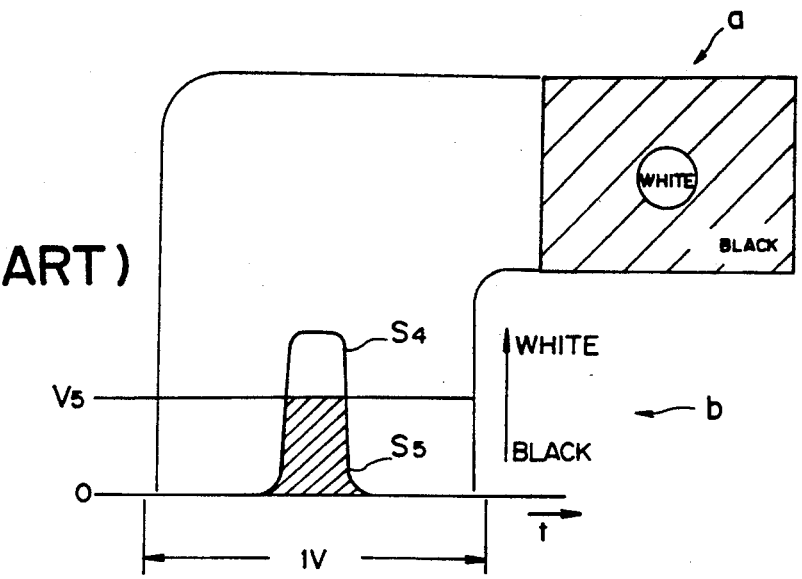
FIG. 3 schematically illustrates the operation of the conventional example.
Figure 6:
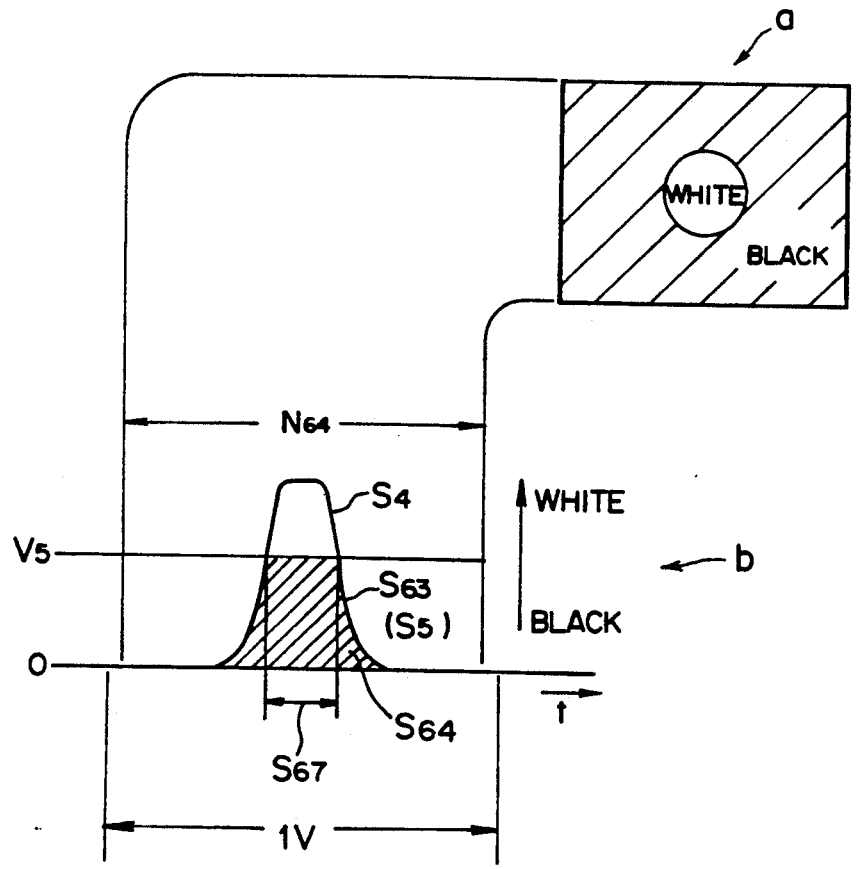
FIG. 6 schematically illustrates the operation of the present invention.

However, in this video signal S63 also, any component exceeding the allowable input level V5 of the converter 5 is clipped. More specifically, when the subject is a high-luminance white disk on a black ground as illustrated at "a" in FIG. 6 (same as the aforementioned example of FIG. 3), the waveform of the video signal S2 is such as shown at "b" in FIG. 6 with changes of the level, where the shaded portion corresponds to the video signal S63.

The signal S63 is supplied to an adder 64 where one pixel (one sample) of each field of the signal S63 is sequentially added or integrated, and a signal S64 outputted from the adder 64 is supplied to a microcomputer 65 on a field-by-field basis.

In this stage, the microcomputer 65 is supplied also with a signal N64 which indicates the number of times of adding the pixels during the fields (number of the samples of the signal S63).

In the microcomputer 65, a division is executed as X64=S64/N64. In this case, the value S64 denotes the area of the shaded portion in FIG. 6, and the value N64 denotes the horizontal length thereof (duration of one field). Therefore the quotient X64 represents the average luminance level obtained by averaging the shaded portion in FIG. 6 during one field.

The signal S62 from the filter 62 is supplied to a signal input of a comparator 66, while the signal indicating the allowable input level V5 of the A-D converter 5 is supplied as a reference level to the comparator 66, which then produces a binary "1" state at comparison output S66 when the level of the signal received at its signal input is equal to V5. Consequently, the comparison output S66 becomes "1" when the level of the analog video signal S4 has exceeded the allowable input level V5 of the A-D converter 5, since then S62=V5.

The comparison output S66 is supplied as a count enable signal to a pixel counter 67, and the signal S62 from the filter 62 is supplied as a count input also to the counter 67, wherein the pixels of the signal S62 during the period of S66="1" are counted per field, and the count output S67 thus obtained is supplied to the microcomputer 65 during every field.

Subsequently in the microcomputer 65, the following calculations are executed.

$$Y = Y1 + Y2 \quad (1)$$

$$Y1 = a \cdot X64 + b \quad (2)$$

$$Y2 = c \cdot S67 + d \quad (3)$$

where a to d are constants.

Figure 7:
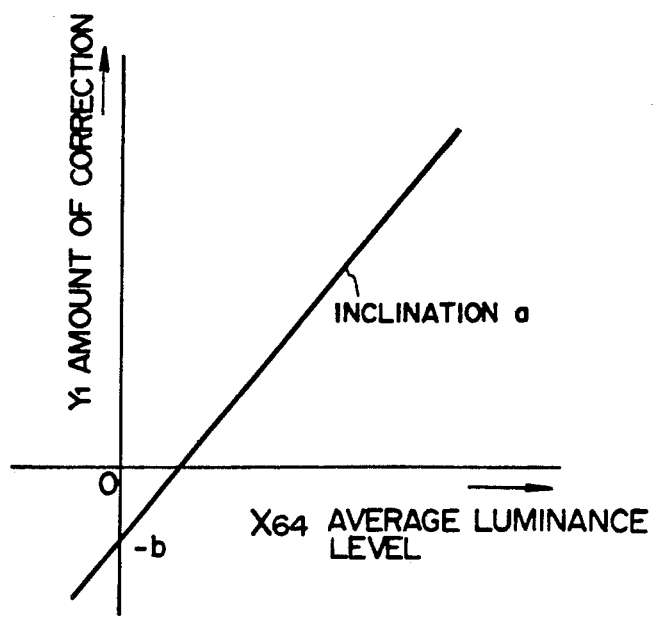
FIGS. 7 and 8 graphically show the characteristics of the present invention.
Figure 8:
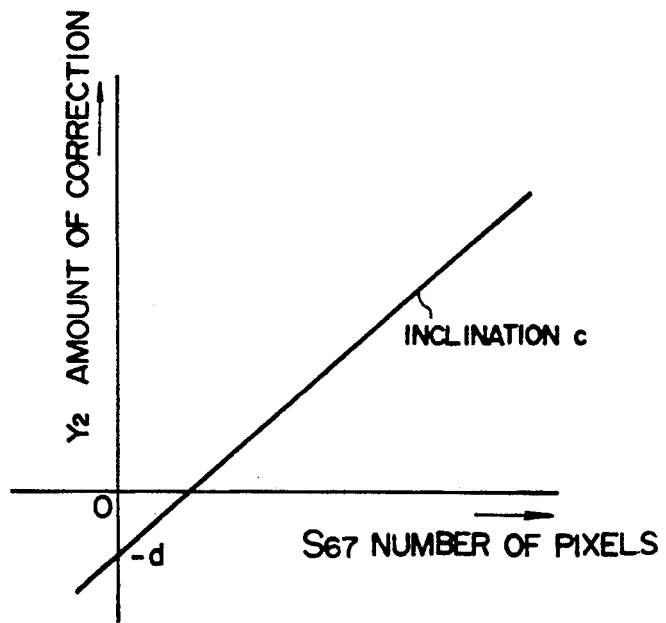

Although a detailed description will be given later, Eq. (2) is graphically shown in FIG. 7 where a first flare correction amount is taken along the ordinate Y1. Meanwhile Eq. (3) is graphically shown in FIG. 8 where a second flare correction amount is taken along the ordinate Y2.

Further in the microcomputer 65, the value Y is obtained during every field, and the average S65 is calculated with regard to the values Y obtained during the latest 8 fields. Then the average value S65 is supplied as a flare correction signal to the subtracter 61, where the average value S65 is subtracted from the video signal S5, and a resultant signal S6 is outputted from a terminal 8 via a gamma corrector 7.

Figure 1:
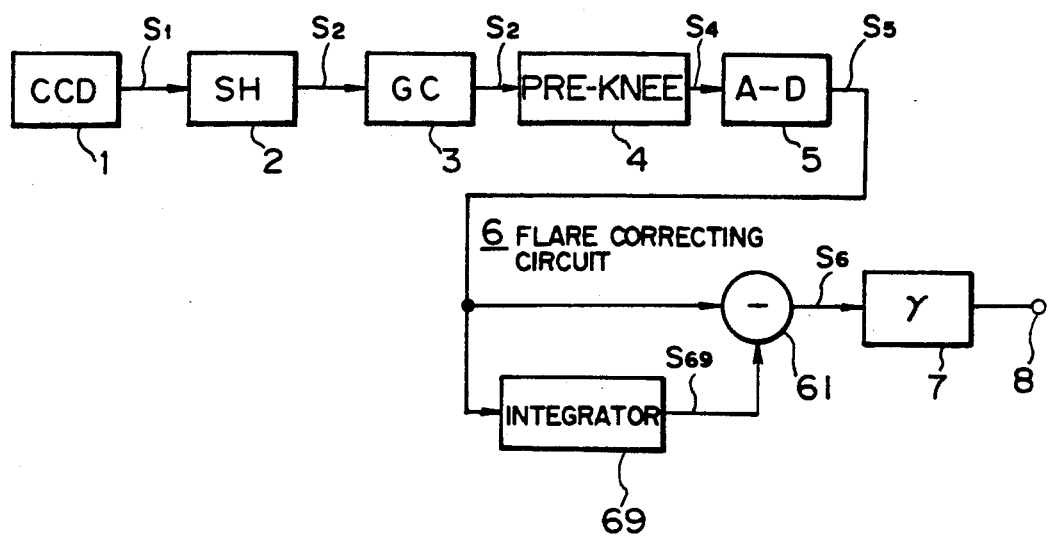
FIG. 1 is a block diagram of a conventional example.
Figure 2:
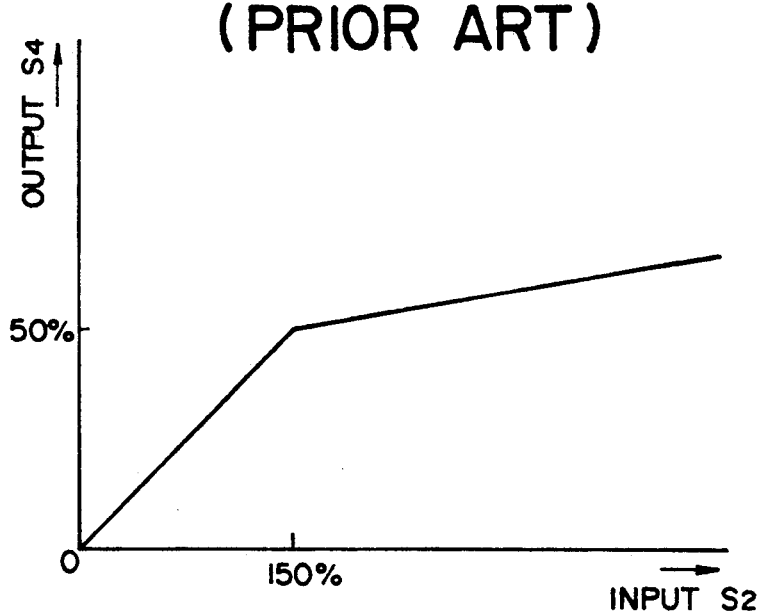
FIG. 2 graphically shows the characteristics of the conventional example.

In this case, the component of Eq. (2) in the average S65 has the value obtained by averaging the luinance levels X64 during the latest 8 fields, so that this component corresponds to the flare correction signal S69 obtained by integrating the video signal with the time constant during several fields in the flare correcting circuit 6 in FIG. 1.

The level of the video signal S4 is compressed in the pre-knee circuit 4, but the linearity of the video signal S63 supplied to the adder 64 is restored to the former state in the inverse converter 63, whereby the component of Eq. (2) in the average S65 is rendered equivalent to the flare correction signal formed out of the video signal S2 anterior to the pre-knee circuit.

Accordingly, if the video signal S4 is lower than the allowable input level V5 of the A-D converter 5, proper flare correction can be performed by such component.

The component of Eq. (3) in the average S65 corresponds to the period where the level of the video signal S4 exceeds the allowable input level V5 of the A-D converter 5, and this component has the value corresonding to the portion of the signal S4 about the level V5. Therefore the average value S65 is nothing but the flare correction signal which is equivalent to the signal formed according particularly to Eq. (3) from the video signal S2 prior to the A-D conversion.

Consequently the video signal S6 outputted from the subtracter 61 is properly corrected with respect to the flare even if the former video signal S4 has passed through the pre-knee circuit 4 or includes any high luminance portion beyond the allowable input level V5 of the A-D converter.

In the case of a color video camera, the aforementioned signal line may be provided for three channels for red, blue and green signals, and the output signals therefrom may be encoded in conformity with the NTSC format for example. It is also possible to modify the above in such a manner that the clock pulses employed for obtaining the signal S62 are counted instead of the pixels of the signal S62, and the counted number may be used as a measured value during the clip period of the A-D converter 5.

Figure 4:
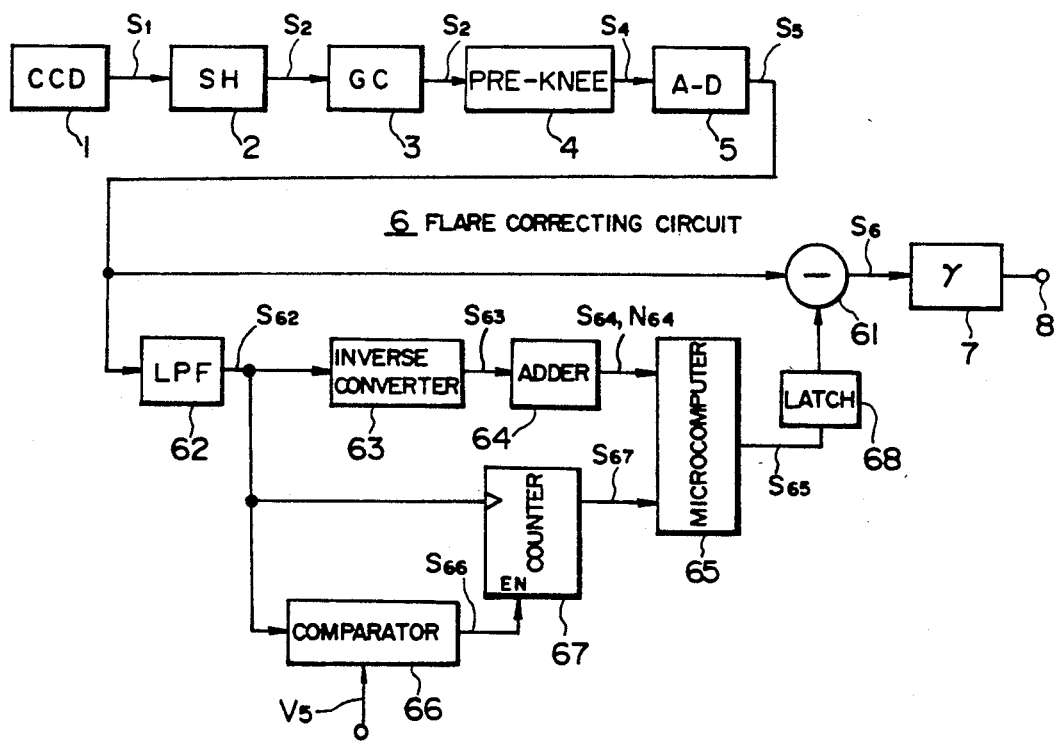
FIG. 4 is a block diagram of a first embodiment of the present invention.

Since the flare correcting circuit of FIG. 4 performs correction of the video signal S5 by applying the flare correction signal S65, the dynamic range of the correction signal S65 is narrower than that of the video signal S5 and, in case each sample of the video signal S5 is composed of 10 bits as mentioned, the correction signal S65 is composed generally of a smaller number of, e.g., 8 bits.

However, when the correction signal S65 has an 8-bit composition, the output port of the microcomputer 65 for delivering the signal S65 therefrom needs to have a capacity of 8 bits. In addition, there is required an 8-bit capacity in a latch circuit 68 and also in the signal line between the output port and the latch circuit 68.

Since the microcomputer 65 is furnished with a margin in its processing capability, flare correction signals for red, blue and green signals in a color video camera can be formed by the single microcomputer. In such as case, however, three 8-bit output ports are required in the microcomputer 65, and further the latch circuit 68 needs to have a 24-bit capacity.

Figure 9:
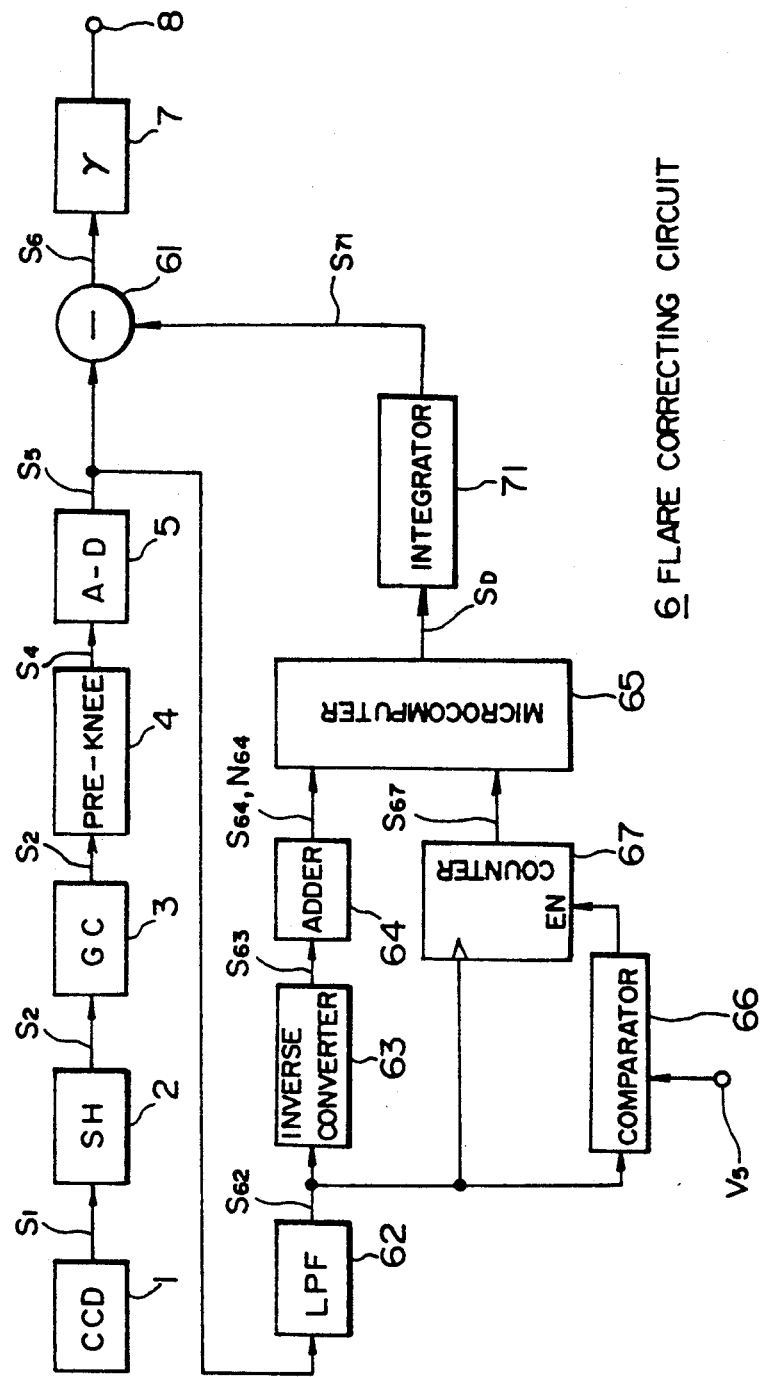
FIG. 9 is a block diagram of a second embodiment of the present invention.

FIG. 9 is a block diagram of a second embodiment contrived to solve the problems observed in the flare correcting circuit of FIG. 4.

The embodiment of FIG. 9 represents an exemplary case where a 2-bit flare correction signal is outputted from a microcomputer 65.

The flare correction signal S65 formed in the microcomputer 65 is compared with the preceding-field correction signal S65, and the resultant signal SD of such comparison is outputted from the microcomputer 65.

The 2 bits of the signal SD representing the result of such comparison between the present correction field and the preceding-field correction signal S65 become as follows for example.

When there is no difference: SD="00"   (1)...
When the former is smaller: SD="01"   (2)...
When the former is greater: SD="10"   (3)...

When the result of the comparison is (2) or (3), the signal SD is outputted repeatedly the number of times corresonding to the differnce between the present correction signal S65 and the preceding-field corection signal S65.

The signal SD is supplied from the microcomputer 65 to an integrator 71 where the following processes are executed.

When SD="00": integral value S71 is left unchanged.

When SD="01": S71 is decreased by 1 per signal SD.

When SD="10": S71 is increased by 1 per signal SD. The integral value S71 is expressed by, e.g., 8 bits.

When SD="00", the integral value S71 is equal to the flare correction signal S65.

The integral value S71 is outputted in parallel and then is supplied as a flare correction signal to a subtracter 61, where flare correction is performed for the video signal S5.

Thus, according to the present invention, the flare correction signal S65 is converted in the microcomputer 65 to a signal SD which indicates the change of the signal S65, and then the signal SD is supplied from the microcomputer 65 to the integtrator 71 serving also as a latch circuit, whereby a flare correction signal S71 is obtained. Therefore the output port of the microcomputer 65 for delivering the signal SD therefrom requires merely a 2-bit composition, sot hat the number of the bits needed in the output port can be reduced. It is also possible to reduce to 2 bits the required capacity of the SD signal line between the output port and the integrator 71.

In the case of a color video camera, it is possible to further diminish the number of bits from 24 to 6 (=2 bits×3 colors) in the output port of the microcomputer 65.

Figure 10:
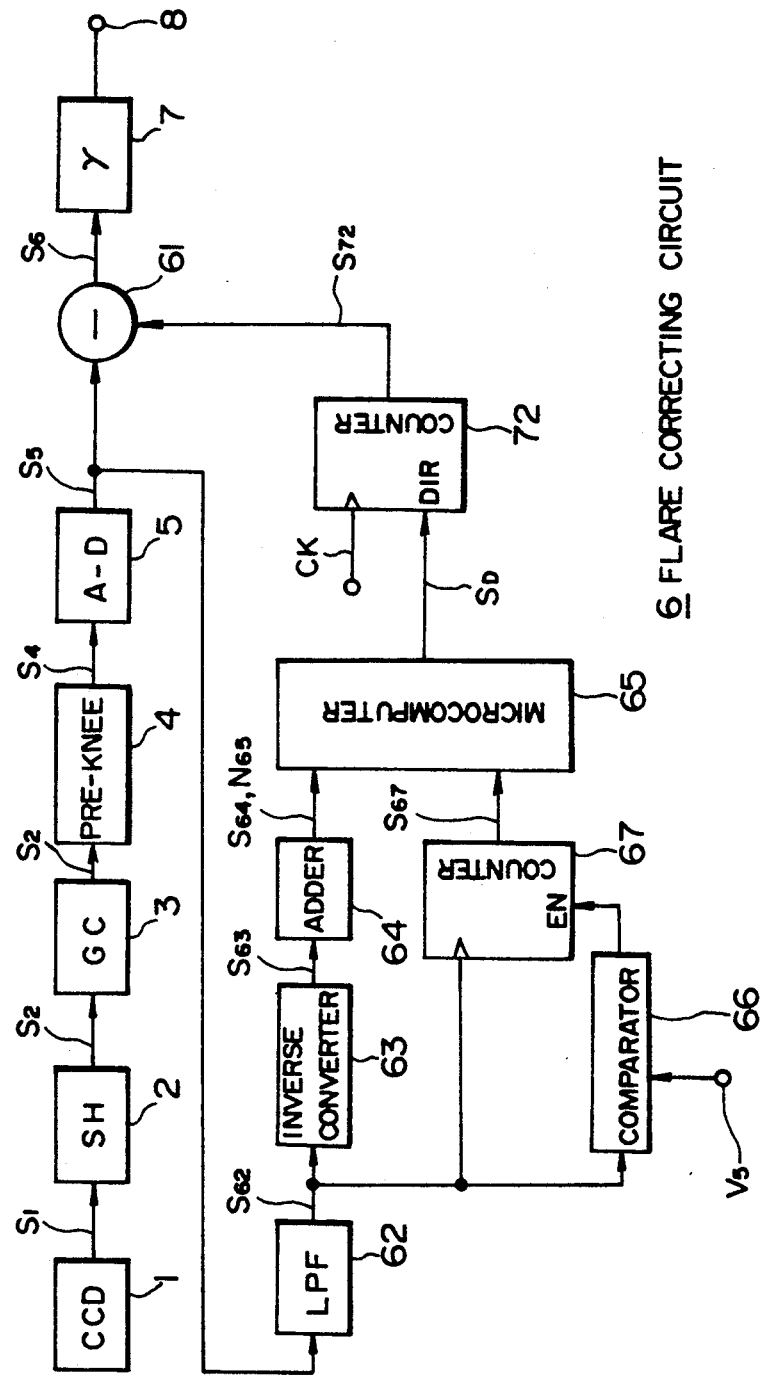
FIG. 10 is a block diagram of a third embodiment of the present invention.

FIG. 10 is a block diagram of a third embodiment of the present invention wherein a 1-bit flare correction signal is obtained from a microcomputer 65.

In the microcomputer 65, a present flare correction signal S65 is compared with a preceding-field correction signal S65, and then a signal SD representing the result of such comparison is outputted from the microcomputer 65. In case the present correction signal S65 indicates no change as compared with the preceding-field correction signal S65, SD="0" and SD="1" are repeated in synchronism with clock pulses CK. . . . (4) . . .

If the former is smaller than the latter, the signal SD="0" is outputted. . . . (5) . . .

And if the former is greater than the latter, the signal SD="1" is outputted. . . . (6) . . .

The signal SD is supplied as a count-direction control signal from the microcomputer 65 to a 9-bit up-down counter 72, which is placed in a down-count mode when SD="0" or in an up-count mode when SD="1". Meanwhile, clock pulses CK are supplied as a count input to the counter 72. The period of such clock pulses CK is set to be equal to the field period for example.

Therefore in the case (4) mentioned above, the count mode of the counter 72 is selectively switched in response to the signal S72 synchronously with the clock pulse CK. As the counter 72 counts the clock pulses CK, merely the least significant bit (LSB) b0 of its counted value S72 is changed to "0" or "1" in synchronism with the clock pulse CK, while the 8 high-order bits b8 to b1 of the counted value S72 remain unchanged except the LSB b0.

In the case (5), the counter value S72 is increased in accordance with each clock pulse CK; whereas in the case (6), the counted value S72 is increased in accordance with each clock pulse CK.

Consequently it follows that the 8 high-order bits b8 to b1 of the counted value S72 corresponds to the flare correction signal S65.

The bits b8 to b1 of the counted value S72 are supplied in parallel as a flare correction signal to the subtracter 61. In this stage, as shown in FIG. 11, the bits b8 to b1 of the counter value S72 are supplied after being shifted by 1 bit toward the LSB with respect to the video signal S5, and a subtraction is executed between the bits b7–b0 of the signal S5 and the bits b8–b1 of the signal S72.

Accordingly the subtracter 61 produces a video signal S6 where the flare correction has been completed by the signal S72.

In this embodiment, the output port of the microcomputer 65 for delivering the signal SD therefrom requires merely a 1-bit capacity, whereby the number of bits of the output port can further be reduced. In addition, that of the SD signal line between the output port and the counter 72 is also reducible to a 1-bit capacity.

In a color video camera, a flare correcting circuit needs to be provided for each of the signal channels for red, blue and green signals.

However, if the flare correcting circuit 6 of FIG. 4 is employed for each signal channel, the entire circuit scale in the whole camera is rendered greater to cause an increase in both dimensions and weight, so that some problems are raised with regard to the portability and the production cost.

FIG. 12 shows a fourth embodiment of this invention representing a color video camera contrived in an attempt to solve the above problem.

In the block diagram of FIG. 12, the component elements corresponding to the CCD image sensor 1 and the circuits 2 through 5 in FIG. 4 are denoted by the same reference numerals with suffixes R, G or B, and a repeated explanation thereof is omitted. Means 1R to 5R are relevant to a red signal channel, means 1G to 5G are relevant to a green signal channel, and means 1B to 5B are relevant to a blue signal channel. Digital red signal S5R, green signal S5G and blue signal S5B are outputted from A-D converters 5R, 5G and 5B, respectively.

And the signals S5R, S5G and S5B are supplied to subtracters 61R, 61G and 61B, respectively.

The signals S5R, S5G, S5B from the converters 5R, 5G, 5B are supplied to a switching circuit 60, which is then sequentially changed every field in response to a signal SV, so that the signals S5R, S5G, S5B are sequentially delivered therefrom. Subsequently the signals S5R, S5G, S5B in the field sequence are supplied to a low-pass filter 62.

The filter 62 and the circuits 63 through 67 posterior thereto are the same as the aforementioned circuits 62 through 67 in FIG. 4 with the exception that microcomputer 65 is supplied with a signal SV which indicates the change position of the switching circuit 60. In response to such signal SV, the microcomputer 65 makes a decision as to which of the color signals S5R, S5G, S5B is being supplied to the low-pass filter 62, and then forms flare correction signals SR, SG, SB for the color signals S5R, S5G, S5B respectively in the field sequence.

More specifically, during the field in which the red signal S5R is supplied to the filter 62, the adder 64 and the counter 67 perform addition and count respectively with regard to the red signal S5R and, upon termination of the field relative to the red signal S5R, the results of such addition and count are processed in the microcomputer 65 so that the value YR corresponding to Eq. (1) is calculated with respect to the red signal S5R.

Similarly, during the field in which the green signal S5G is supplied to the filter 62, the adder 64 and the counter 67 perform addition and count respectively with regard to the green signal S5G and, upon termination of the field relative to the green signal S5G, the results of such addition and count are processed in the microcomputer 65 so that the value YG corresponding to Eq. (1) is calculated with respect to the green signal S5G.

Further during the field in which the blue signal S5B is supplied to the filter 62, the adder 64 and the counter 67 perform addition and count with regard to the blue signal S5B and, upon termination of the field relative to the blue signal S5B, the results of such addition and count are processed in the microcomputer 65 so that the value YB corresponding to Eq. (1) is calculated with respect to the blue signal S5B.

Thus the values YR, YG, YB are calculated in the field sequence by the microcomputer 65.

Furthermore, the values YR of merely the latest 8 fields out of the entire calculated values YR are averaged by the microcomputer 65 to obtain a desired flare correction signal SR, which is then converted to a 1-bit signal SDR corresponding to the signal SD in the aforementioned flare correcting circuit of FIG. 10. Similarly in the microcomputer 65, flare correction signals SG and SB are produced from the values YG and YB during the latest 8 fields, and then such flare correction signals SG and SB are converted respectively to a 1-bit signal SDG and a 1-bit signal SDB.

The signals SDR, SDG, SDB thus obtained are outputted from the microcomputer 65 in the field sequence and are supplied to the switching circuit 68 which is selectively changed by the signal SV, so that the signals SDR, SDG, SDB are delivered separately from the switching circuit 68. Subsequently the signals SDR, SDG, SDB are delivered separately from the switching circuit 68. Subsequently the signals SDR, SDG, SDB are supplied as count-direction control signals to the up-down counters 72R, 72G, 72B respectively. Meanwhile clock pulses CK are selectively supplied as count inputs to the counters 72R, 72G, 72B in synchronism with the supply of the signals SDR, SDG, SDB.

Consequently the former flare correction signals SR, SG, SB are outputted from the counters 72R, 72G, 72B respectively.

Thereafter the flare correction signals SR, SG, SB from the counters 72R, 72G, 72B are supplied respectively to the subtracters 61R, 61G, 61B.

In this case, the flare correction signals SR, SG, SB are formed out of the field-sequential signals S5R, S5G, S5B in contrast with the aforementioned flare correction signal S65 of FIG. 4 formed out of the successive-field signals S5. But there exists no problem since each of such correction signals SR, SG, SB may be an average during a time ranging from several fields to one second or so.

Thus, in this embodiment where the flare correction signals SR, SG, SB are formed out of the red signal S5R, green signal S5G and blue signal S5B in the field sequence by the time division system, it becomes possible to use the circuit 6 in common to all of the red signal S5R, green signal S5G and blue signal S5B, so that the entire circuit scale in the whole video camera is not enlarged to consequently avert any increase in both dimensions and weight. And the production cost is substantially not raised since the additional requisite is merely the switching circuit 60 alone.

Furthermore, a 1-bit capacity is sufficient in each of the output ports of the microcomputer 65 for delivering the signals SDR, SDG, SDB to the integrators 68R, 68G, 68B.

The counters 72R, 72G, 72B in this embodiment may be replaced with integrators so that the flare correction signals SR, SG, SB can be obtained in the same manner as in the aforementioned example of FIG. 9. In addition, instead of the pixels of the signal outputted from the filter 62 and counted by the counter 67, the clock pulses employed for obtaining such signal may be counted and used as a measured value during the clip period of the A-D converter 5.

Besides the above, the red, green and blue signals representative of three primary colors in the above embodiment may be replaced with cyan, magenta and yellow signals as well.

What is claimed is:

1. A video camera including an image sensor for producing an analog video signal, an analog-to-digital converter for converting the analog video signal to a digital video signal having a plurality of samples so that any sample thereof above a predetermined luminance level is clipped, and a flare corrected circuit for removing a flare component superposed on the digital video signal, said flare correcting circuit comprising:
   an average luminance level detector for detecting an average luminance level of the samples of said digital video signal over a plurality of fields thereof;
   a clip period detector for producing a clip detection signal representing a time period during which the samples of said digital video signal are clipped when the analog video signal is converted to the digital video signal by said analog-to-digital converter;
   a flare correction signal generator for producing a flare correction signal in accordance with said average luminance level and said clip detection signal; and
   a subtractor for subtracting the flare correction signal from the digital video signal.

2. The video camera according to claim 1, wherein said clip period detector comprises:
   a comparator for comparing levels of the samples of said digital video signal during a time period including a plurality of fields with a comparison level to detect a predetermined relationship thereof; and
   a counter for counting the samples of said digital video signal having said predetermined relationship with respect to said comparison level.

3. The video camera according to claim 1, wherein said flare correction signal generator comprises:
   a flare signal variation detector for sequentially outputting successive 2-bit digital signals corresponding to a variation of a present-field flare correction signal with respect to a preceding-field flare correction signal; and
   an integrator for integrating said 2-bit digital signals and the preceding-field flare correction signal to produce an integral value as the present-field correction signal.

4. The video camera according to claim 1, wherein said flare correction signal generator comprises:
   a flare signal variation detector for producing a 1-bit digital signal which corresponds to a variation of a present-field flare correction signal with respect to a preceding-field flare correction signal; and
   an up-down counter controlled in response to said 1-bit digital signal synchronously with a clock signal of a predetermined cycle in such a manner as to selectively increase, decrease or retain a count value thereof and operative to provide the count value as said flare correction signal.

5. The video camera according to claim 1, further comprising:
   a pre-knee circuit connected between said image sensor and said analog-to-digital converter, and serving to compress the analog video signal produced by said image sensor having a level above a predetermined level; and
   an inverse converter connected between said analog-to-digital converter and said average luminance level detector, and serving to process the digital video signal inversely to the process executed by said pre-knee circuit.

* * * * *